April 3, 1928.

C. F. STAPLES 1,664,575

TRANSMISSION MECHANISM

Filed May 29, 1925   2 Sheets-Sheet 1

Inventor
Charles F. Staples.
By
Attorneys

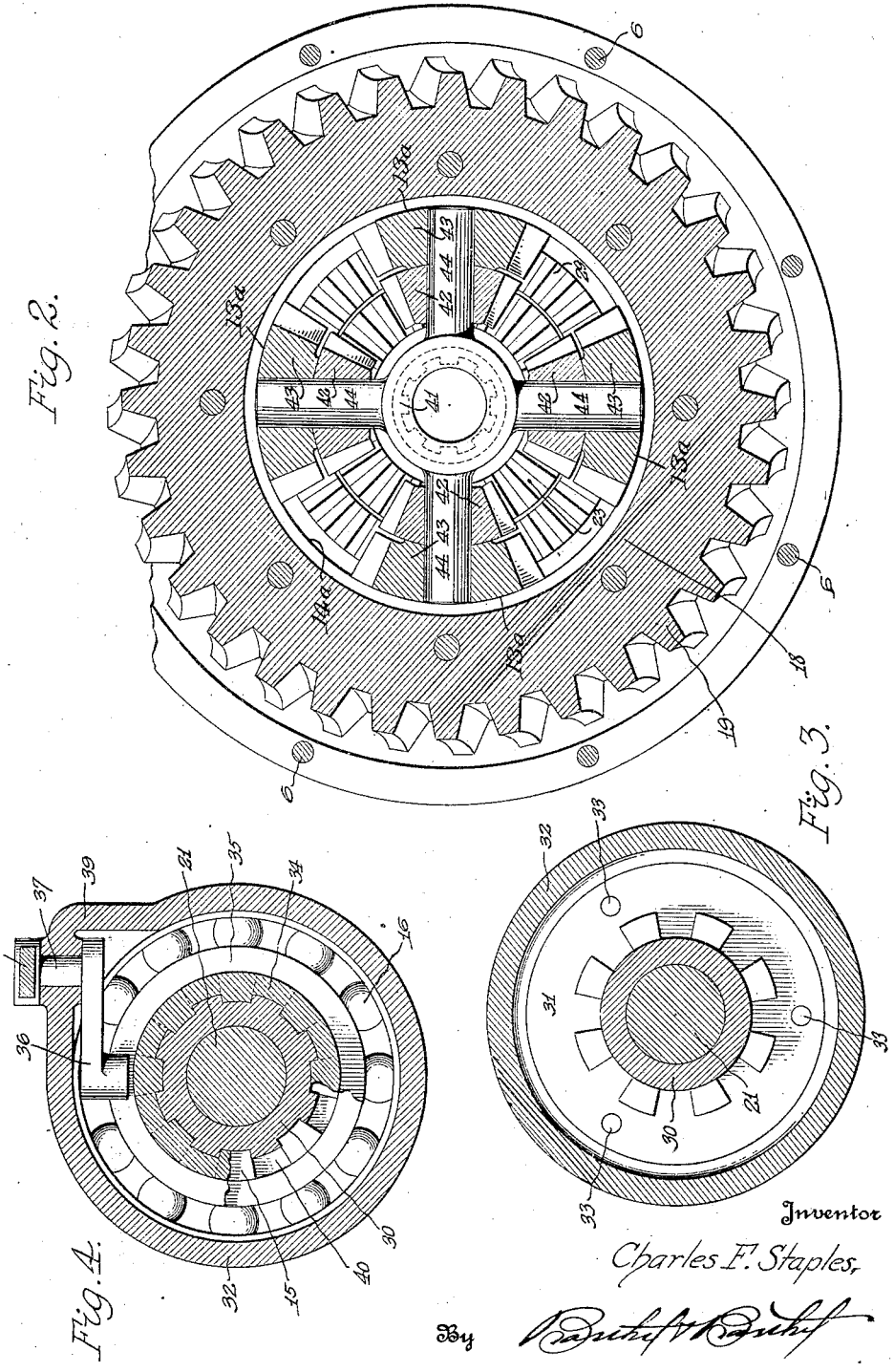

Patented Apr. 3, 1928.

1,664,575

UNITED STATES PATENT OFFICE.

CHARLES F. STAPLES, OF DETROIT, MICHIGAN, ASSIGNOR, BY DIRECT AND MESNE ASSIGNMENTS, OF ONE-HALF TO LLOYD M. FIELD, OF ALAMEDA, CALIFORNIA, AND ONE-HALF TO ARTHUR A. WIEDEMAIER, OF DETROIT, MICHIGAN.

TRANSMISSION MECHANISM.

Application filed May 29, 1925. Serial No. 33,610.

This invention relates to a transmission mechanism and has special reference to a differential reduction gear mechanism that may form part of the rear axle assembly of a motor vehicle. A well known type of pleasure and commercial motor driven vehicle includes a rear axle assembly having a differential mechanism driven from the motor or engine of the vehicle for imparting rotation to the wheels at the ends of the axle assembly and in order to change speed a transmission mechanism or change speed mechanism is located adjacent the engine and includes high, low and reverse speeds. In addition to these variable speeds, my invention aims to provide a further speed reduction, at the differential mechanism of the rear axle assembly. This additional gear reduction is accomplished right in the differential mechanism without sacrificing any of the benefits derived from the usual differential mechanism, without any material enlargement of the differential housing, and without complicating the differential structure to the extent of decreasing production.

Numerous advantages are gained by an additional gear reduction, particularly at the differential mechanism, among which may be mentioned greater power for climbing hills and going through heavy, muddy and sandy roads; saving of gas and oil; less engine heat and consequently less demand on the cooling system of the engine; less strain and vibration on the transmission mechanism; increased braking power, and reduced load or strain on the propeller shaft and ring gear, because a desired gear ratio may be selected to meet any variance in driving conditions.

My invention will be hereinafter specifically described and then claimed, and reference will now be had to the drawings wherein Figure 1 is a longitudinal sectional view of a portion of a rear axle assembly including a differential and reduction gear mechanism;

Fig. 2 is a cross sectional view taken on the line II—II of Fig. 1;

Fig. 3 is a similar view taken on the line III—III of Fig. 1, and

Fig. 4 is a similar view taken on the line IV—IV of Fig. 1.

Figure 1:
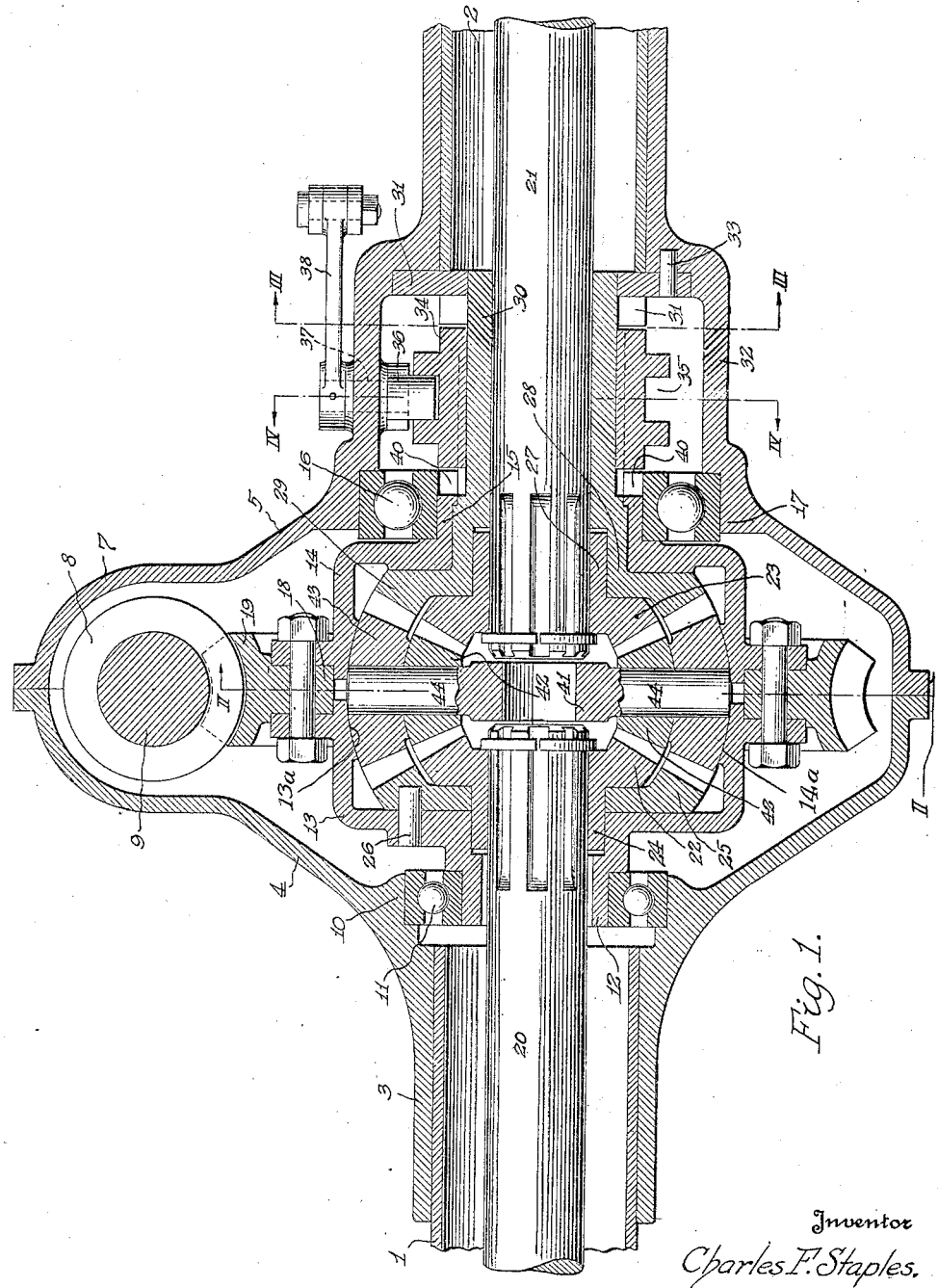

In the drawings, the reference numerals 1 and 2 denote rear axle tubes having the inner ends thereof in spaced relation and coaxially of each other. Mounted on the inner ends of said tubes are the sleeve portions 3 of a differential housing, composed of two parts 4 and 5 suitably connected together, as at 6, and said housing parts have an enlargement 7 for a worm 8 or other power transmission member mounted on a shaft 9 adapted to be driven from the power plant of a vehicle, for instance the engine of a truck.

The housing part 4 has an annular support 10 for an anti-frictional bearing 11 and journaled in said bearing is the hub portion 12 of a differential casing part 13 which co-operates with another part 14 in providing a differential casing. The casing part 14 has a hub portion 15 journaled in an anti-frictional bearing 16 carried by an annular support 17 forming part of the differential housing part 5. The casing parts 13 and 14 are formed to provide an annular concave way or bearing 14$^a$, the purpose of which will hereinafter appear.

Suitably mounted between the casing parts 13 and 14 is the web portion 18 of a ring gear or worm wheel 19 constantly meshing with the worm 8 so as to be driven thereby to impart rotation to the differential casing within the differential housing.

In the rear axle tubes 1 and 2 are longitudinally alining axle shafts 20 and 21 respectively having the confronting ends thereof in spaced relation with inner differential gears 22 and 23 mounted on the inner ends of said shafts for rotation therewith. The inner differential gear 22 has a hub portion 24 journaled in the casing part 13 and between the inner differential gear 22 and the casing part 13 is an outer differential gear 25, which is pinned or otherwise fixed, as at 26 to the casing part 13 to rotate therewith.

The inner differential gear 23 has a hub portion 27 journaled in the hub portion 28 of an outer differential gear 29 and said outer differential gear is between the inner differential gear 23 and the casing part 14 with the hub portion 28 journaled in the hub portion 15 of the casing part 14. The hub portion 28 of the outer differential gear 29 is elongated to form a sleeve 30 on the axle shaft 21 and said sleeve has its outer end journaled in a fixed clutch member 31 mounted in an enlargement 32 of the differential housing part 7. The clutch member 31 may be fixed in the enlargement 32 by pins 33 or any suitable fastening means.

Slidably keyed or splined on the sleeve 30 to rotate therewith, is a shiftable clutch member 34 having a peripheral groove 35 into which extends a crank 36 on the inner end of the shaft 37 having an exterior crank 38 by which the shaft may be rocked to shift the clutch member 34. The shaft 37 is journaled in an offset portion 39 of the enlargement 32 and the crank 38 is adapted to be operated from a remote point for instance by the driver of the motor truck.

In addition to the clutch member 34 being shifted into engagement with the fixed clutch member 31, for a low speed, it is adapted to be shifted into the bearing 16 and into engagement with a clutch member 40 forming part of the differential casing part 14.

Between the confronting ends of the axle shafts 20 and 21 is a differential spider 41 having radially disposed pins or stud shafts 44 which are of greater length than ordinary spider pins. Rotatable on said spider pins are a plurality of inner differential pinions 42 and a plurality of outer differential pinions 43. The differential pinions 42 mesh with the inner differential gears 22 and 23 and the outer differential pinions 43 mesh with the outer differential gears 25 and 29. The outer differential pinions 43 have convex outer end faces 13$^a$ which bear on the annular concave way or bearing 14$^a$ and permit of the spider rotating or floating relative to the differential casing, which is necessary when the outer differential gear 29 is held for the casing and differential gears to turn relative to the gear 29.

With the clutch member 34 shifted into engagement with the clutch member 40 of the differential casing, there will be the usual differential action for the reason that the differential outer gears 25 and 29 are caused to rotate with the differential casing and power is transmitted through the spider 41 and the inner differential gears 22 and 23 to the axle shafts 20 and 21.

When the clutch member 34 is shifted into engagement with the fixed clutch member 31 the outer differential gear 29 is held so that the casing part 14 may revolve about it. Power is then transmitted from the casing 13 through the outer differential gear 25, the outer differential pinions 43, the inner differential pinions 42 and the inner differential gears 22 and 23 to the axle shafts 20 and 21. This affords a gear reduction with the differential action at any time.

I attach considerable importance to the outer differential gears and pinions being arranged about or circumferentially of the inner differential gears and pinions, thus suggesting that this arrangement may be extended to the extent of obtaining additional reductions of speed should it be so desired.

It is thought that the operation and utility of my mechanism will be apparent without further description, and while in the drawings, there is illustrated a preferred embodiment of my invention, it is to be understood that the structural elements are susceptible to such variations and modifications as fall within the scope of the appended claims.

What I claim is:—

1. In a differential mechanism, a driven casing, inner differential gears and pinions arranged in said casing and adapted to be driven from said casing, shafts adapted to be driven by said differential gears and pinions, a gear reduction for said differential mechanism interposed between said driven casing and said inner differential gears and pinions for translating motion from said casing to said inner differential gears and pinions, said gear reduction including outer differential gears and pinions in said casing about said inner differential gears and pinions, and a spider having arms passed through said pinions for carrying the same, one of said outer differential gears being constantly fixed to said casing and meshed with said outer pinions; and means adapted for controlling the other of said outer differential gears to have a reduction of speed from said differential casing to said shafts.

2. A differential mechanism as called for in claim 1, wherein said means includes a shiftable clutch member by which the outer differential gear last mentioned may be held stationary.

3. A differential mechanism as called for in claim 1, and a housing for said mechanism, said housing having a side enlargement for said means and by which housing said means may be held stationary.

4. A transmission mechanism including shafts, inner differential gears having hub portions on said shafts, pinions supported between said inner differential gears, means adapted to drive said gears and pinions, to impart rotation to said shafts, including outer gears on the hub portions of said inner gears, outer pinions between said outer gears, said outer gears and pinions being constructively arranged to provide a reduced speed to said shafts, and controlling means for said gearing, said controlling means including a shiftable clutch member on the hub portion of one of said outer gears.

5. In a housing, a driven differential casing therein, shafts extending into said casing, a differential mechanism in said casing adapted to impart rotation to said shafts from said casing, said differential mechanism including inner and outer pinions and inner and outer gears, the inner pinions meshing with the inner gears, the outer pinions meshing with the outer gears, and the inner and outer pinions being operatively associated for translating motion from an outer gear to an inner gear, an outer hub portion carried by one of said outer differential gears and extending out of said casing into said housing, and means on said outer hub portion engageable with said casing and adapted for securing said outer hub portion to said casing for rotation in synchronism.

6. A housed differential mechanism as called for in claim 5, wherein said means is shiftable on said outer hub portion from engagement with said casing to engagement with said housing for a reduced differential speed of said shafts relative to said driven casing.

7. A housed differential mechanism as called for in claim 5, wherein said driven differential casing is formed with an annular way as a bearing for the outer differential pinions.

8. In a housing, a driven differential casing therein, said casing being formed to provide an annular internal way, shafts extending into said casing, a differential mechanism in said casing adapted to impart rotation to said shafts from said casing, said differential mechanism including gears, one of which is fixed to said casing, and a spider having pinions slidable on the casing way, and means adapted for holding another of said differential gears to cause said spider and its pinions to bodily rotate on the way of said casing.

In testimony whereof I affix my signature.

CHARLES F. STAPLES.